United States Patent
Huard

(10) Patent No.: US 7,367,797 B2
(45) Date of Patent: May 6, 2008

(54) NEEDLE VALVE FOR FILLING A MOLD WITH AN ORGANIC MATERIAL IN THE LIQUID STATE

(75) Inventor: Marc Huard, Alfortville (FR)

(73) Assignee: Essilor International (Compagnie D'Optique), Charenton le Pont (FR)

( * ) Notice: Subject to any disclaimer, the term of this patent is extended or adjusted under 35 U.S.C. 154(b) by 641 days.

(21) Appl. No.: 10/762,353

(22) Filed: Jan. 23, 2004

(65) Prior Publication Data

US 2004/0150125 A1    Aug. 5, 2004

(30) Foreign Application Priority Data

Jan. 24, 2003    (FR) .................................. 03 00800

(51) Int. Cl.
    *B29C 45/23*    (2006.01)
(52) U.S. Cl. .................... 425/562; 264/328.9; 425/564
(58) Field of Classification Search ............... 425/562, 425/563, 564, 565, 566; 264/328.9
    See application file for complete search history.

(56) References Cited

U.S. PATENT DOCUMENTS

| 3,180,360 A | 4/1965 | Francois |
|---|---|---|
| 4,190,621 A | 2/1980 | Greshes |
| 4,474,356 A | 10/1984 | Baumann |
| 5,110,514 A | 5/1992 | Soane |
| 5,662,839 A | 9/1997 | Magne |
| 5,695,793 A | 12/1997 | Bauer |
| 5,853,630 A | 12/1998 | Hettinga |
| 5,902,525 A | 5/1999 | Hettinga |
| 6,056,902 A | 5/2000 | Hettinga |
| 6,060,005 A | 5/2000 | Hettinga |
| 6,287,107 B1* | 9/2001 | Kazmer et al. ............. 425/562 |
| 6,328,316 B1* | 12/2001 | Fukuhara et al. ........... 277/644 |
| 7,114,934 B2* | 10/2006 | Biermann et al. .......... 425/4 R |
| 2002/0050664 A1 | 5/2002 | Moore et al. |

FOREIGN PATENT DOCUMENTS

EP        0 715 946 A1    6/1996

* cited by examiner

*Primary Examiner*—Tim Heitbrink
(74) *Attorney, Agent, or Firm*—Young & Thompson

(57) ABSTRACT

The valve includes:
  a body in which is formed a flow passage for the material to be molded having a constriction bounded on its upstream side by a change of section forming a seat, and
  a needle mounted in the body and having a closure shoulder adapted to bear in the closure position against the seat formed by the change of section in the flow passage in the body, so as to shut off the flow passage and, projecting from the closure shoulder, an opening adjustment tip that has a nonuniform section and is engaged in the constriction to define a certain flow section therewith in each intermediate position of the needle.

25 Claims, 5 Drawing Sheets

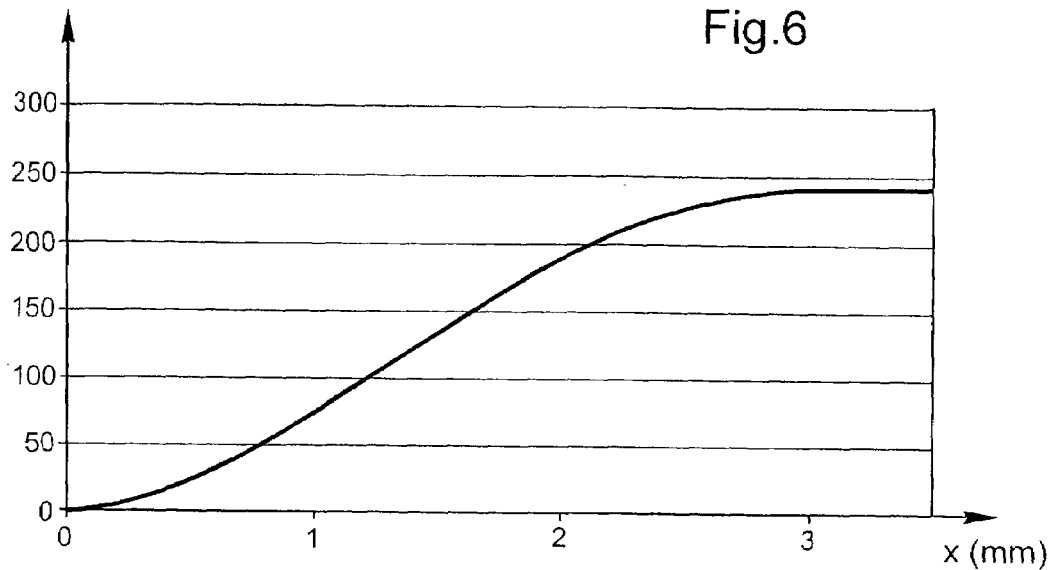
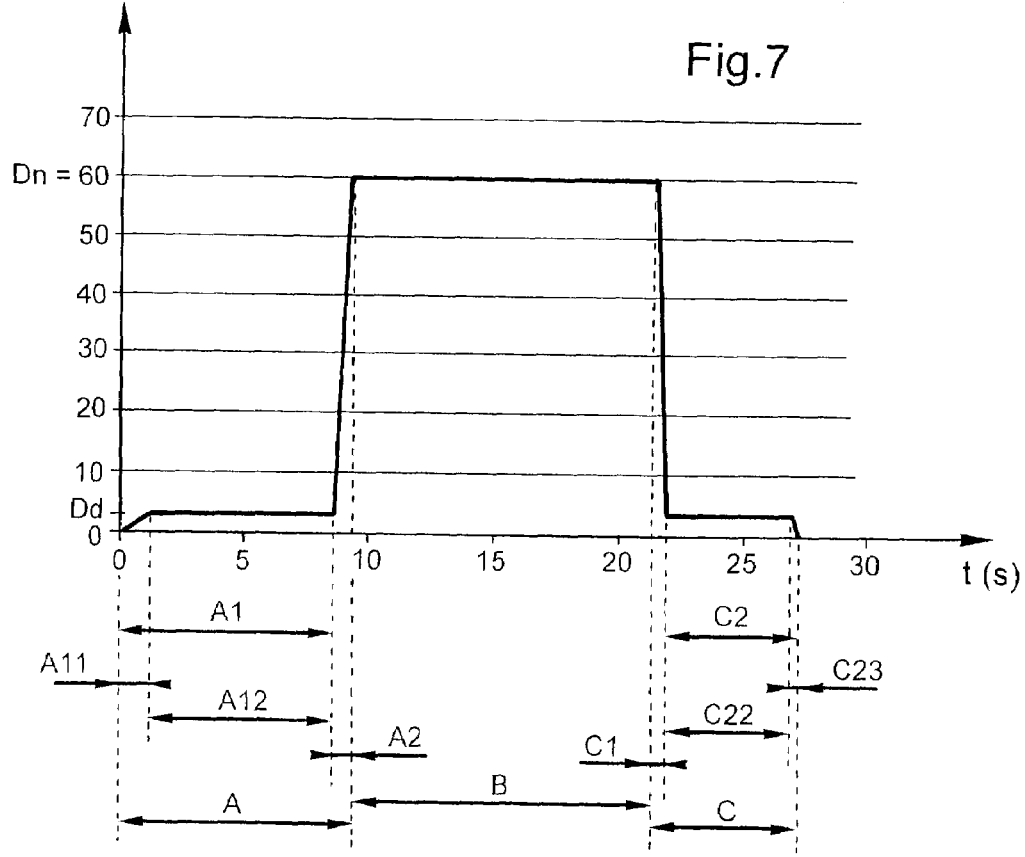

NEEDLE VALVE FOR FILLING A MOLD WITH AN ORGANIC MATERIAL IN THE LIQUID STATE

The present invention relates generally to the fabrication by molding of organic material optical components, such as ophthalmic lenses for prescription spectacles and/or sunglasses, instrument lenses, or precision optical components. It relates more precisely to filling a mold with the organic material in the liquid state and its subject matter is a valve for controlling such filling.

An optical component such as an ophthalmic lens is conventionally molded by means of a mold formed of two molding shells at the periphery of which there is an annular closure member defining with them the required molding cavity. After filling the molding cavity with the material in the liquid state, polymerization of said material by a source of heat or radiation is initialized.

For filling the mold, the material to be molded is introduced into the molding cavity by way of an opening that is duly formed for this purpose at the periphery of the molding shells (in practice, usually in the closure member), so as not to interfere with the optically active area of the resulting optical lens. The filling phase is carried out by means of a filling device adapted to deliver a particular dose of material to be molded. The filling device includes a nozzle for introducing the material into the mold, associated with the filling opening of the mold. Upstream of the nozzle, and either separately from it or in one piece with it, there is a valve that is controlled, preferably automatically, to meter accurately the quantity of material delivered to the mold at a sufficient flowrate.

A molding cavity filling sequence typically comprises the following steps:
  rise in flowrate, by opening the valve, from a zero flowrate to a nominal flowrate,
  full flowrate filling, maintaining the nominal flowrate,
  reduction of flowrate, by closing the valve, from the nominal flowrate to the zero flowrate.

In particular, because of filling rates resulting from production rates imposed by economic imperatives, experience shows that optical lenses obtained under the above conditions frequently have more or less serious local optical defects, leading to relatively high rejection rates and/or to mediocre optical quality of the optical components formed in this way. To avoid such defects, very slow filling and/or a relatively long waiting time (of the order of one to two hours) between filling and initializing polymerization can undoubtedly be imposed, but this solution naturally goes against the production rate imperatives already referred to. A more effective proposal is to adopt a particular configuration of the mold when filling it, with the mold vertical with its filling open at the bottom. However, even with a filling configuration of this kind, defects can persist, depending on the material used and most importantly on the required production rates.

Our investigations have led us to search for an explanation within the filling device itself, which has an interior passage that is more or less smooth and within which the material to be molded is exposed, to some degree at least, to disturbances of the flow which, given the filling rate and the viscosity of the material to be molded, prevent laminar flow and, if the process is not well controlled, cause microbubbles to appear. In particular, the portion of the molding cavity situated around the filling opening features irregularities resulting in particular from the presence of the tip of the filling nozzle, which projects into the mold at this location.

The irregularities in the surface of the molding cavity may cause irregularities in the flow that cause microbubbles to appear. Furthermore, depending on how filling is conducted and controlled, the material may be subject to irregularities or even sudden fluctuations in the flowrate. At the same time, since the material to be molded is a mixture of constituents likely to have different refractive indices and/or coefficients of viscosity, relatively high local index gradients can appear as the result of shear or stretching, which cannot fail to lead to other optical defects, such as the "syrup" effect well known to glassmakers, if polymerization occurs too quickly after filling. In this context, the valve might seem a particularly sensitive component in that, to exercise its opening, closing and flowrate regulation functions, it varies the flow section, generating turbulence or cavitation or like phenomena leading to optical defects in the optical components finally obtained.

Based on this observation, the invention proposes a valve that preserves the optical integrity of the material to be molded when it flows, including on opening and closing.

Thus the invention provides a needle valve for filling a mold with a synthetic material, said valve including:
  a body in which is formed a flow passage for the material to be molded having an inlet opening, an outlet opening and, between said two openings, a constriction bounded on its upstream side by a change of section forming a seat, and
  a needle mounted in the body so that it is mobile between a fully open position and a closure position closing the flow passage with, between these two extreme positions, a range of intermediate positions of variable opening, said needle having a closure shoulder adapted to bear in the closure position against the seat formed by the change of section in the flow passage in the body, so as to shut off the flow passage and, projecting from said closure shoulder, an opening adjustment tip that has a nonuniform section and is engaged in the constriction to define a certain flow section therewith in each intermediate position of the needle.

Thus the flowrate can be adjusted smoothly, without sudden fluctuations. Complete closure of the valve is assured by a quasilinear circular contact between the closure shoulder of the needle and the seat of the body, rather than a surface contact between the tip of the needle itself and the interior surface of the body. Surface contact would create a flattening effect with local shearing and overpressurization of the material, encouraging the appearance of microbubbles or syrup effects, primarily on opening the valve.

In one particularly advantageous embodiment, the closure shoulder of the needle is rounded and the change of section of the flow passage is conical.

The invention also provides a method of molding an organic material optical component in an appropriate molding cavity, the method including a sequence of filling the molding cavity with the organic material in the liquid state and a step of polymerizing the material in said molding cavity, which method is characterized in that the molding cavity filling sequence is effected by means of a valve according to the invention. Either the velocity or the position of the needle of the valve can be controlled to execute the required sequence.

The molding cavity filling sequence advantageously comprises the following steps:
  rise in flowrate from a zero flowrate to a nominal flowrate greater than 40 g/min,
  full flowrate filling, with the nominal flowrate maintained, and flowrate reduction from the nominal flowrate to the zero flowrate, and the rise in flowrate step is divided into at least two phases:

a low flowrate start of filling phase, which continues until the mold is filled with the material to a height of at least 2 mm at the deepest point of the mold, the flowrate increasing during this phase to a maximum start of filling flowrate less than 20 g/min, and then a main rise in flowrate phase to increase from the start of filling flowrate to the nominal flowrate.

Thus, because of the low flowrate start of filling phase, the molding cavity begins to fill slowly, so as to "wet" the bottom of the mold with the material to be molded until a certain minimum volume of material has been introduced into it. This is because it is in fact the start of filling of the mold that seems to be most critical. Thanks to the slowness of the flow when starting filling, the small volume of material initially introduced in this way remains free of microbubbles or at the least, if a few microbubbles should nevertheless appear, they can escape easily because of its shallow depth of material. Beyond the intended minimum depth of material, filling can be accelerated without risk of turbulence, since the volume of material already introduced exercises a fluid damping function and, at a constant flowrate, the rate of advance of the free surface of the material in the mold is reduced as the molding cavity becomes wider.

It is advantageous if the material is introduced into the molding cavity through an orifice in a lower portion of said cavity and polymerization of the material is initiated immediately after filling. This reduces the cycle times whilst preserving the optical quality of the molded lens. Moreover, it is then particularly advantageous to combine this bottom mode of filling with beginning filling with a low flowrate. This slow start of filling phase gently "wets" the lower portion of the molding cavity, which is precisely that in which the filling opening and in particular the tip of the filling nozzle are located. This prevents any jet effect (by analogy with a jet of water, all proportions remaining the same) such as would result from beginning filling too quickly.

Reference will be made to the appended drawings, in which:

FIG. 6 is a graph representing the correspondence between the axial position of the needle of the valve and the flowrate delivered by the valve under specific conditions;

FIG. 7 is a graph representing one example of a mold filling sequence executed by means of the valve from FIGS. 1 to 6;

FIG. 1 represents a device for molding a synthetic material optical component such as an ophthalmic lens intended to be fitted to a pair of prescription spectacles or sunglasses.

Figure 1:
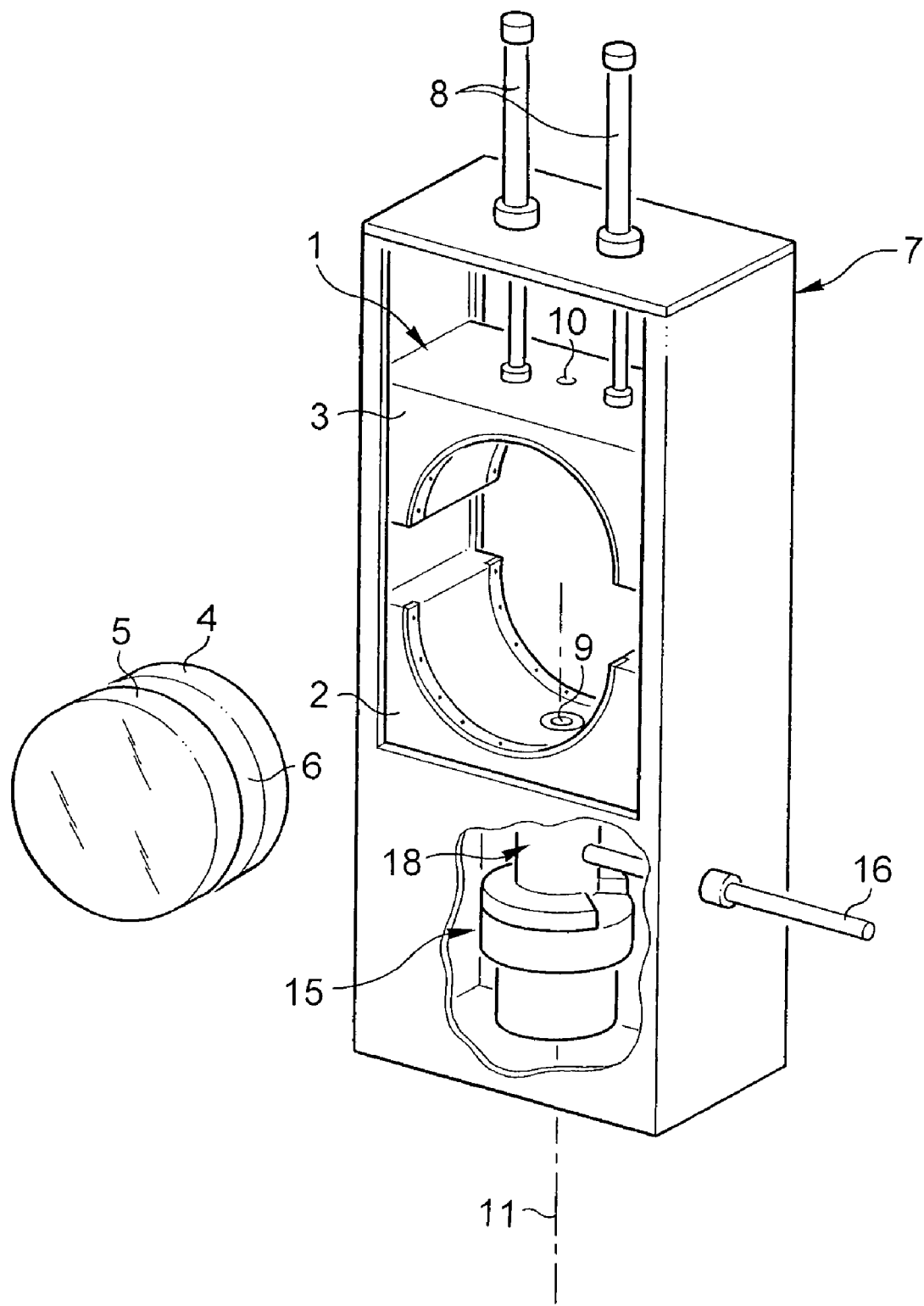
FIG. 1 is a perspective view of an ophthalmic lens molding device integrating a valve according to the invention.
Figure 2:
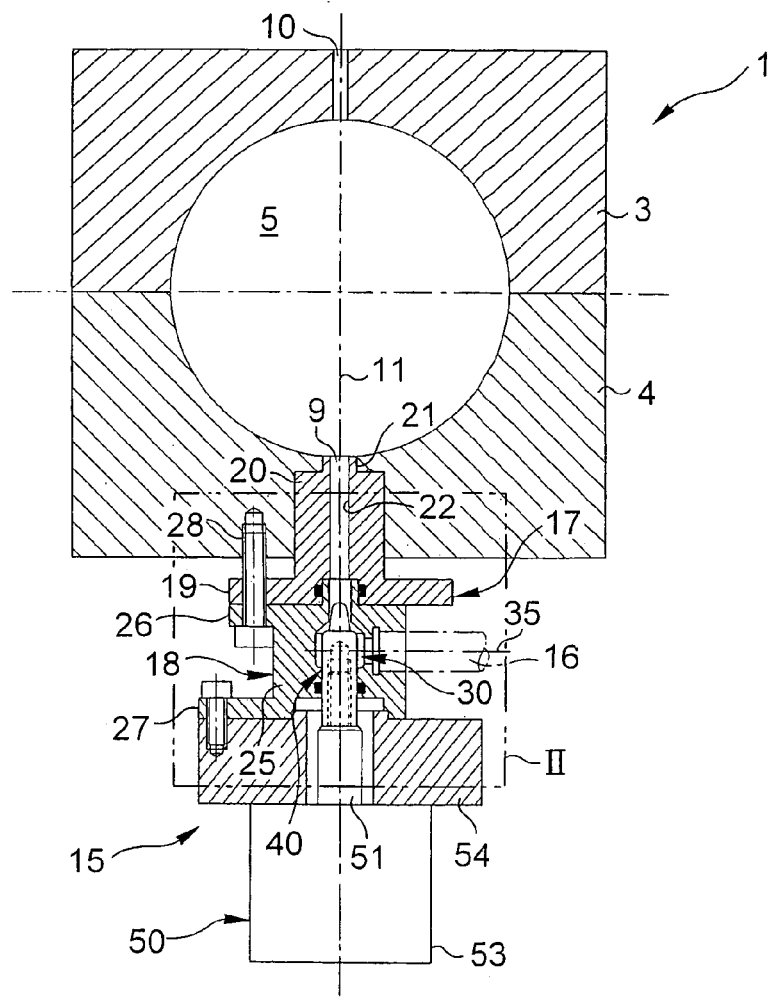
FIG. 2 is a view in axial section of the FIG. 1 device.

The molding device comprises two portions, namely a mold 1 enclosing a molding cavity defining the lens to be molded and a filling device 15.

The details of the mold 1 are not relevant to the present invention and the mold is therefore described only briefly. Besides, in the context of the present invention, any sort of mold can be used, and a corresponding molding process. For example, molds and processes of the type described in the documents EP 0715946, U.S. Pat. No. 4,190,621 and U.S. Pat. No. 5,110,514, the mold and molding process descriptions of which are hereby incorporated into the present description, can be used.

In the example shown, the mold 1 is of the type described in the document EP 0715946. It includes two jaws 2, 3 each having a semicylindrical interior surface complementary to that of the other one and surrounding two molding shells 4, 5 disposed on edge in a vertical plane. The two shells 4, 5 define between them a required molding cavity 6. The two jaws 2, 3 are carried by a frame 7 and the upper jaw 3 can be moved vertically in translation by actuators 8. The bottom jaw 2 has a casting orifice 9 situated in the lower portion of the molding cavity 6, and preferably at the lowest point thereof. In other words, in this example, the casting orifice 9 opens onto the lowest generatrix of the interior surface of the jaw 2; it is arranged along a vertical casting axis 11. The upper jaw 3 has in its upper portion a vent 10 on the same vertical axis 11 and preferably opening onto the highest generatrix of the interior surface of the jaw 3.

Below the lower jaw 2 is the device 15 for filling the molding cavity. The overall object of this device is to fill the molding cavity with the required quantity of synthetic material without generating either microbubbles or a syrup effect, with a view to obtaining a molded component of good optical quality.

The filling device 15 is connected by a pipe 16 to supply means (not shown) adapted to supply the molding cavity continuously with material to be molded. By continuous supply in the present context is meant supply at a substantially constant pressure, free of any sudden fluctuations. The supply means comprise, for example, a pressure source disposed on the upstream side of a reservoir which, forming a service tank, contains the material to be molded and is connected to the filling device by the pipe 16. For example, the pressure source is a compressed air reservoir which is connected to the reservoir above the material to be molded contained therein and is under the control of a regulator.

The material to be molded can be a composition that is at least partly polymerizable by exposure to light, for example by ultraviolet radiation, a composition that is at least partly polymerizable by heat, or a composition that is both polymerizable by exposure to light and polymerizable by heat.

The filling device 15 comprises two main components arranged along the casting axis 11, namely a nozzle 17 and a needle valve 18.

The nozzle 17 has an axis of rotational symmetry which is the casting axis 11 and its outside comprises three staggered sections, namely a fixing plate 19, a cylindrical or parallelepipedal body 20 received in a corresponding housing of the lower jaw 4 of the mold, and an end-piece 21 passing through a corresponding bore in the lower jaw 4 to an outlet flush with the interior face of that jaw. Internally, the nozzle 17 has an interior passage 22 through it, concentric with the axis 11, which at its upper end opens into the molding cavity 6, forming the casting orifice 9 previously mentioned.

The valve 18 is under the nozzle 17, i.e. upstream thereof with respect to the direction of flow of the material to be molded. The valve includes a body 25 centered on the casting axis 11 and having an upper fixing flange 26 pressed against the fixing plate 19 of the nozzle 17 by means of screws 28 which, passing through the flange 26 and the plate 19, are screwed into corresponding screwthreads in the jaw 4 to fix the nozzle 17 and the body 25 of the valve 18 at one and the same time to the jaw 4.

A flow passage 30 for the material to be molded inside the body 25 of the valve 18 has an inlet opening 31, an outlet opening 32 and, between said two openings, a constriction 33 flanked on its upstream side by a change of section 34 forming a seat, as explained in more detail later.

Here the flow passage 30 is L-shaped, having a vertical first branch centered on the flow axis 11 and whose free end constitutes the outlet opening 32, and a horizontal second branch centered on an axis 35 perpendicular to the flow axis 11. This second branch may not be perpendicular to the axis 11 either.

The first branch of the channel 30 is staggered, with a wide base 36 and the constriction 33 followed by the outlet opening 32 at the end. The base 36 and the constriction 33 are cylindrical. The constriction 33 has a diameter equal to that of the outlet opening 32, which therefore extends it. The transition between the wide base 36 and the constriction 33 is produced by the change of section 34, which is conical and merges with the constriction 33 and the base 36 via rounded, i.e. non-angular, connecting regions. This uniformity of section downstream of the change of section 34 and the gentle transition in diameter resulting from the conical shape of the change of section 34 and the absence of angular regions prevents or limits for the most part turbulent flow. An angle at the apex from 30 to 60° is preferably chosen for the conical change of section 34. However, it is not indispensable for the change of section 34 to be strictly conical. It could even be beneficial to form the change of section as a circular surface with a curved axial section, for example close to a toric surface, or an even more complex shape with an undulating axial section for a smooth connection to the wide base 36 and the constriction 33.

Similarly, downstream of the outlet opening 32, the interior passage 22 of the nozzle 17 is cylindrical, with the same diameter as said outlet opening 32, at least in its portion that adjoins the outlet opening 32. The flow of the material to be molded therefore encounters no irregularity between the valve 18 and the nozzle 17.

The second branch of the flow passage 30 is reduced to the inlet opening 31 that discharges directly at the base of the first branch. At its upstream end (relative to the direction of flow), the inlet opening 31 discharges into a screwthreaded housing 37 adapted to receive a screwthreaded connector of the pipe 16.

In the example envisaged here, the dimensions of the flow passage 30 of the valve 18 are as follows:

- the diameter of the inlet opening 31 is 5 mm;
- the diameter of the base 36 of the first branch of the flow passage 30 is 10 mm;
- the common diameter of the outlet opening 32 and the constriction 33 (and of the passage 22 of the nozzle 17) is 5 mm; and
- the angle at the apex of the conical change of section 34 is 45°.

The above dimensions are to a tolerance of ±20%.

The valve 18 further includes a needle 40 mounted in the body 25 to move between a fully open position authorizing a maximum flowrate and a closed position shutting off the flow passage 30; between these two extreme positions, there is a range of intermediate positions in which the flowrate allowed by the valve 18 varies.

The needle 40 has an axis of rotational symmetry and is mounted in the body 25 to slide along its axis that coincides with the flow axis 11. To be more precise, the needle 40 has an elongate base 41 with a cylindrical exterior surface concentric with the axis 11 and a tip 42 extended in the direction of the axis 11 and cooperating with the constriction 33 in the flow passage 30 to exert a flowrate adjustment function, and to this end having a section that is nonuniform throughout its length, as explained in more detail hereinafter.

The elongate cylindrical base 41 slides in a bore 45 passing through the body 25 along the axis 11. An ethylene-propylene-diene elastomer O-ring seal 44 is mounted between the body 25 and the cylindrical base 41 of the needle.

In the example shown in FIGS. 1 to 5, the tip 42 has a conical exterior surface making it possible to establish a correspondence between the axial position of the needle 40 and the flowrate delivered by the valve 18, for a constant inlet pressure of the material to be molded. In intermediate positions of the needle 40, the conical tip 42 of the needle 41 is engaged within the constriction 33 in the flow passage 30, and it is clear that the flow section for the material to be molded between said tip 42 and the constriction 33 depends on the flow section for the material to be molded between said tip and the constriction 33. For a given inlet pressure of the material to be molded, the flowrate allowed by the valve 18 can therefore be adjusted by adjusting the position of the needle 40 along its axis 11. An example of this correspondence for a supply pressure of 0.3 bar and a material having a viscosity of 200 centipoises (cps) is given in FIG. 6, which shows the curve of the material flowrate Q in g/min plotted on the ordinate axis as a function of the axial position x of the needle 41 in millimeters, plotted on the abscissa axis. The axial position of the needle 41 is marked from its closure position at the origin of the abscissa axis, and extends as far as its maximum open position, which here is 3.5 mm from its closed position, where the flowrate reaches close to 250 g/min.

Figure 3:
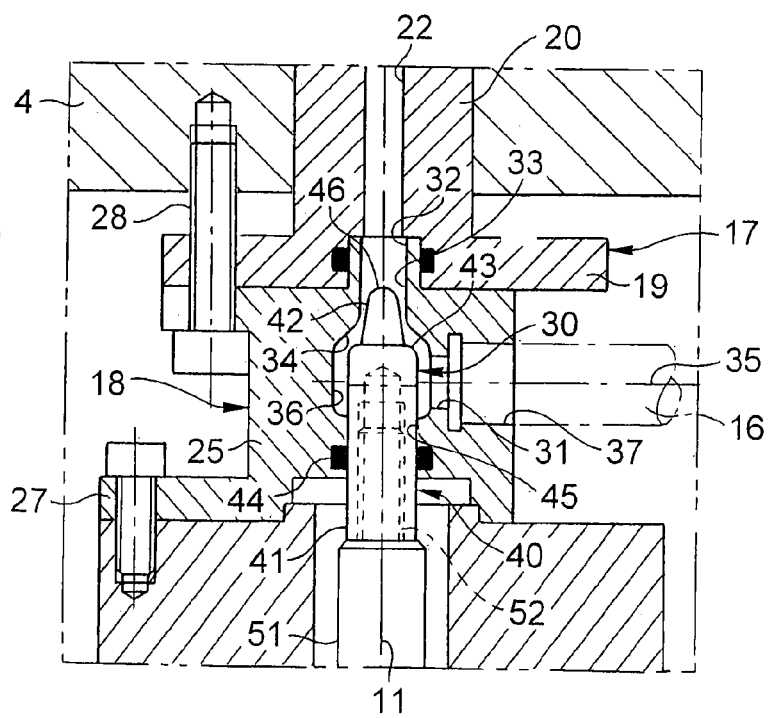
FIG. 3 is an enlarged detail view of the region II in FIG. 1.
Figure 4:
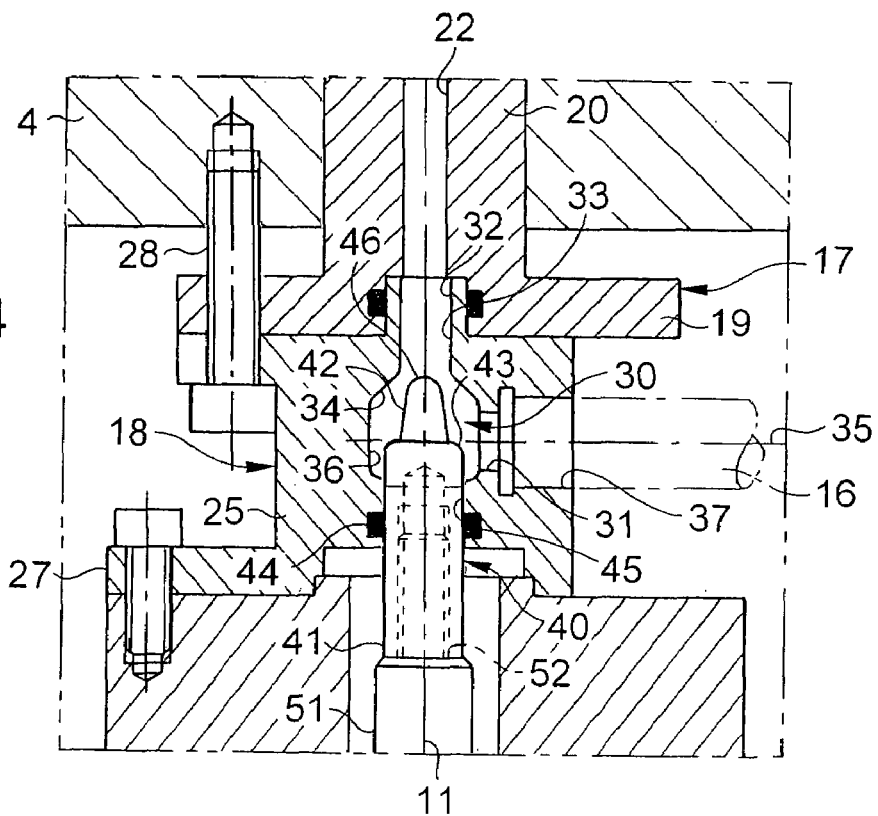
FIG. 4 is a view analogous to FIG. 2, showing a fully open configuration of the valve.
Figure 5:
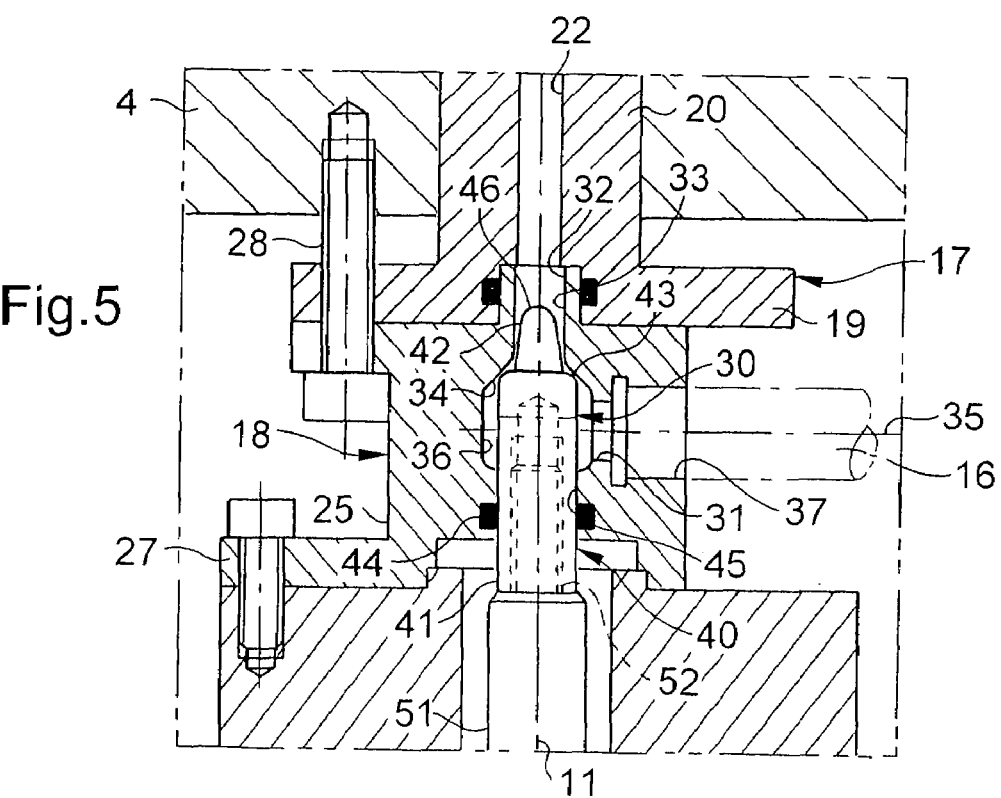
FIG. 5 is a view analogous to FIG. 2, showing a closed configuration of the valve.

Moreover, the tip 42 has a free end 46 that is rounded, to be more precise that in this embodiment is spherical. This rounded configuration of the end of the tip 42 prevents or at least limits turbulence in the flow. This is because, in the partially open flow situation, as can be seen in FIGS. 3 and 4, the end of the tip 42 is engaged in the constriction 33. Similarly, in the maximum open position (FIG. 4), at which the flowrate is highest, the end 46 of the tip 42 is at the threshold of or even slightly engaged within the constriction 33. It is in fact advantageous to limit the travel of the needle to improve responsiveness and most importantly to minimize the effects of pumping and shear applied to the material by the needle as it moves.

Between its tip 42 and its elongate base 41, the needle 40 has an external closure shoulder 43 adapted to bear, in the closed position, against the change of section 34 of the first branch of the flow passage 30. Thus, in shutting off the flow channel 30, in co-operation with the shoulder 43 on the needle 40, the change of section 34 forms a seat for the shoulder.

The closure shoulder 43 of the needle is rounded, to be more precise has a toric shape.

In the example under consideration, the external dimensions of the needle 40 are as follows:

the diameter of the elongate base 41 is 8 mm;

the conical tip 42 has an angle at the apex of 12.4° and a larger diameter of 4.7 mm at its junction with the base 41;

the radius of the free end 46 is 2 mm; and the radius of the toric shoulder 43 is 2 mm.

The above dimensions are given to a tolerance of ±20%.

To prevent the risk of binding of the needle in the bore 45 in the valve body 25 following the deposition of very thin layers of material on the surface of the needle and/or the bore 45, the inside surfaces of the flow passage 30 and the bore 45 in the body, and at least the portion of the outside surface of the needle 40 that enters the flow passage 30 and is in contact with the material, are made of PTFE. In the present example, the needle 40 is made entirely of PTFE and the body 25 is made of metal coated with PTFE or the like on the inside (the type of coating chosen for the inside of the valve body depends on the metal from which it is made).

The axial position of the needle 40 is controlled by a double-acting actuator 50 with a rod 51 mobile along the axis 11 having at its free end a threaded rod 52 screwed into a threaded axial bore in the elongate base 41 of the needle 40. The body 53 of the actuator 50 is fixed to a spacer 54 which is in turn fixed to the fixing flange 27 of the body 25 of the valve 18. The spacer 54 has a central bore along the axis 11 through which the piston rod 51 of the actuator 50 passes freely.

The actuator 50 can be of the type in which either the position or the speed in translation of its rod, and thus of the needle 40, is controlled.

In the example shown in FIGS. 2 to 5, the actuator is of the position control type; with the aid of an associated conventional control unit (not shown), it controls accurately the linear position of the rod 51 and thus of the needle 40 along the axis 11. It is typically an HSI 46441-05-M3 HSI® stepper motor actuator from TAA Magnetic. This type of actuator is used for its accuracy and flexibility, in the case of complex casting sequences involving variations in the flowrate of material between a plurality of values defined accurately as a function of ad hoc parameters such as the total volume to be filled or the geometry of the cavity to be filled.

The situation in which the actuator is of the speed control type is discussed later, in conjunction with the description of a variant of the needle.

The globally conical shape of the tip of the needle shown in FIGS. 2 to 5, although advantageous in the context discussed hereinabove, is not limiting on the invention, and the tip of the needle can instead have a shape other than conical. In particular, it can have a number of portions with different shapes, with no discontinuity, at least no first order discontinuity, between the various portions.

In service, an organic material optical component is molded by introducing the material into the molding cavity 6 in the liquid state and then polymerizing the material in the molding cavity 6. When it has hardened sufficiently, the lens is ejected from the mold.

To fill the mold 1, the material to be molded is introduced into the molding cavity via the casting orifice 9 under the control of the valve 15.

Because the inlet opening 31 is connected by the pipe 16 to a source of material to be molded at constant pressure, it suffices to open the valve 18 to a greater or lesser degree to obtain the required flowrate of the material to be molded and progressively fill the molding cavity 6 of the mold 1 from the bottom.

To overcome gravity, it suffices to employ supply means adapted to circulate the material to be molded without pressurizing it.

With an actuator 50 of the linear position control type as described previously with reference to FIGS. 1 to 5, it is possible to carry out a precisely controlled filling sequence such as that defined by FIG. 7 to fill the molding cavity from the bottom in order to mold a finished lens directly. The sequence is given for a supply pressure of 0.07 bar and a material having a viscosity of 200 cps. This figure depicts the function Q(t) giving the material flowrate Q into the molding cavity in grams per minute as a function of time t in seconds. See FIG. 7 for details of the law Q(t) of variation of the flowrate as a function of time.

The filling sequence has three main steps: a rise in flowrate step A, a full flowrate filling step B, and a flowrate reduction step C. As explained in detail hereinafter, the rise in flowrate step A and the flowrate reduction step C are each divided into three phases, whereas the full flowrate filling step is at constant flowrate.

Step A: Rise in Flowrate.

The filling sequence begins of course with a rise in flowrate during which the flowrate of material entering the molding cavity increases from zero to a predetermined nominal flowrate Dn. In practice, this step is performed by opening the valve, with progressive withdrawal of the needle from its initial closure position to its open position. This opening, which generates a rise in flowrate that is problematic in that it often proves to be the origin of the optical defects previously cited, is divided into two phases, precisely to avoid the occurrence of such defects: a low flowrate start of filling phase A1 and a main rise in flowrate phase A2. In the low flowrate start of filling phase A1 the flowrate increases, although not strictly so, with a plateau at a constant flowrate. It is therefore divided into two subphases: a preliminary rise in flowrate subphase A11 and a low flowrate start of filling plateau subphase A12. The rise in flowrate step A therefore comprises three phases in total.

Phase A11: Preliminary Rise in Flowrate

The first phase is the preliminary rise in flowrate phase A11 (FIG. 7) during which the flowrate increases from its initial zero value to a relatively low predetermined value that is referred to as the start of filling flowrate Dd.

To obtain this first rise in flowrate, in practice the valve is partially opened. The needle 40 is drawn by the rod 51 of the actuator 50 from its initial closure position, in which the shoulder 43 bears against the change of section 34 of the first branch of the flow passage 30, to a nearby, relatively slightly open position. Filling begins as soon as the needle leaves its closure position.

In the FIG. 7 example, the flowrate Dd is 3 g/min and the preliminary rise in flowrate phase lasts 1.2 s. In this example, the flowrate curve during this phase is virtually linear. The rate of rise in the flowrate (the first derivative of the flowrate with respect to time, corresponding to the slope of the flowrate curve) during this preliminary rise in flowrate phase is therefore 15 g.min$^{-2}$. However, the preliminary rise in flowrate is not necessarily linear, and other rise in flowrate curve shapes could be employed for this phase, in particular with second order continuity of flowrate relative to time at the start and end of the phase. Generally speaking, whatever the shape of the preliminary rise in flowrate curve, rates of rise in flowrate from 0 to 500 g.min$^{-2}$ and preferably less than 200 g.min$^{-2}$ can be envisaged.

Phase A12: Low Flowrate Start of Filling Plateau

After the preliminary rise in flowrate phase A11, the flowrate of material reaches a plateau (A12, FIG. 7) during which the flowrate is maintained constant at its start of filling flowrate value Dn for a predetermined time period of a few seconds. To this end, the needle 40 of the valve is held immobile in its slightly open position that defines the required start of filling flowrate Dd.

The flowrate Dd is much less than the nominal flowrate Dn defined hereinafter in relation to the full flowrate filling phase B. To prevent turbulence, it is preferable for the start of filling flowrate Dd to be below 20 g/min. In practice, the start of filling flowrate Dd can be from 3 to 8 g/min. In the FIG. 7 example, it is 3 g/min.

The duration of the low flowrate start of filling phase A1 depends on the flowrate Dd and the volume of material to be introduced slowly into the molding cavity to start filling. The low flowrate filling phase continues until the molding cavity of the mold is filled to a predetermined height, as measured between the deepest point of the molding cavity and the free surface of the material to be molded in line with that point. This height depends on individual circumstances and in particular the material to be molded and the configuration of the mold. In any event, trials have indicated that a minimum height of 2 mm is necessary.

On the other hand, because the low flowrate filling phase significantly increases the overall duration of the filling sequence, it is preferable to stop it as soon as possible. It therefore seems preferable for the height of material indicating the end of the low flowrate start of filling phase to be less than 12 mm. In most of the tests, a material height from 5 to 10 mm appeared to be a good compromise. In the example discussed here a height of 7 mm had been adopted.

In practice, when the low flowrate filling phase A includes a plateau A12, as in the FIG. 7 example, the duration is advantageously from 4 to 10 seconds. In the FIG. 7 example, the duration of the phase A12 is 7 s.

Thus filling is started slowly with a slow flow of material. The small volume of material initially introduced in this way remains free of microbubbles or, should a few microbubbles appear, they are easily eliminated because of the very fact that it is thin. As the material is introduced into the molding cavity through an orifice in the lower portion of said cavity, this start of filling phase gently "wets" the lower portion of the molding cavity, which is precisely that containing the filling opening and in particular the tip of the filling nozzle. This prevents any jet effect (by analogy with a jet of water, all proportions remaining the same) that could result from starting filling too quickly and would inevitably lead to trapping of air bubbles in the material to be molded.

Phase A2: Main Rise in Flowrate

When the bottom of the molding cavity is sufficiently full, a main rise in flowrate phase (A2, FIG. 7) is carried out. The second rise in flowrate is much steeper than the first one A11. The flowrate is increased from the start of filling flowrate, which must be low for the reasons indicated above, to the nominal flowrate, which must be as high as possible to reduce the cycle time. In the FIG. 7 example, the nominal flowrate Dn is 60 g/min. The duration of this main rise in flowrate phase is 1 s and the flowrate curve during this phase is virtually linear. The rate of rise in the flowrate (the first derivative of the flowrate relative to time, corresponding to the slope of the flowrate curve, i.e. to the acceleration of the flowrate) is therefore approximately 3000 g.min$^{-2}$ during this phase A2. However, the main rise in flowrate is not necessarily linear, and other rise in flowrate curve shapes can be employed for this phase, with in particular a second order flowrate continuity with respect to time at the start and end of the phase. Generally speaking, regardless of the shape of the main rise in flowrate curve, rates of rise in flowrate from 2 000 to 7 000 g.min$^{-2}$, or even higher, can be envisaged.

In practice, during this phase, the needle 40 is pulled by the rod 51 of the actuator 50 to its maximum open position. The open section and therefore the flowrate vary throughout this phase in accordance with a law defined by the variation of the linear position of the needle in conjunction with the shape of the profile of the tip 42 of the needle 40.

Step B: Full Flowrate Filling

The nominal (maximum) flowrate having been reached, filling continues at the full flowrate in the full flowrate filling step (B, FIG. 7). This fast filling phase stems from the need to minimize the cycle time. However, it does not cause harmful turbulence in that turbulence is prevented by the presence in the bottom of the molding cavity of a volume of material in the liquid state that was introduced carefully during the low flowrate filling rate A12 and now exercises a fluid damping function. Nevertheless, the nominal flowrate must not exceed a limit beyond which the fluid damping function would no longer be effective and the risk of turbulence would reappear.

A compromise must therefore be found for the nominal flowrate, which must be as high as possible to reduce the cycle time without causing turbulent flow, which could not fail to affect the optical integrity of the material. Thus a nominal flowrate Dn from 50 to 300 g/min could be defined. In the FIG. 7 example, the nominal flowrate Dn is 60 g/min.

In practice, during this step, the needle 40 is held immobile in its maximum open position, in which the end 46 of its tip is at the threshold of the constriction 33. The open section is therefore virtually defined by the constriction 33 alone. The duration of this phase, which is equal to the time for which the needle 40 is stationary, is 14 s in this example.

Step C: Reduction in Flowrate

At the end of filling, the valve must be closed to revert from the nominal flowrate to the zero flowrate, as accurately as possible and still without degrading the material. Like the rise in flowrate, this reduction in flowrate is divided into three phases in this example, namely a main flowrate reduction phase C1, a low flowrate end of filling plateau phase C22, and a final reduction in flowrate phase C23.

Phase C1: Main Flowrate Reduction

Closure of the valve is started by a first flowrate reduction phase, referred to as the main reduction phase (Cl, FIG. 7), during which the flowrate is reduced from the nominal flowrate Dn to a predetermined end of filling flowrate Df. In the FIG. 7 example, the end of filling flowrate Df is 3 g/min, and the flowrate therefore falls from 60 g/min to 3 g/min. In this example, the duration of this main flowrate reduction phase is 1 s and the flowrate curve during this phase is virtually linear. The rate of flowrate reduction (the first derivative of the flowrate with respect to the time, corresponding to the slope of the flowrate curve) during this phase is therefore 3 000 g.min$^{-2}$. Generally speaking, whatever the shape of the main flowrate reduction curve, flowrate reduction rates from 2 000 to 7 000 g.min $^{-2}$ can be envisaged.

In practice, during this phase, the needle 40 is pulled by the rod 51 of the actuator 50 from its fully open position toward its closed position, as far as a partially open position corresponding to the required end of filling flowrate Df. The open section and thus the flowrate vary throughout this phase according to a law defined by the variation of the linear position of the needle in conjunction with the shape of the profile of the tip 42 of the needle 40.

Phase C22: Low Flowrate End of Filling Plateau

The material flowrate then reaches a plateau with the end of low flowrate filling phase (C22, FIG. 7), during which the end of filling flowrate Df is maintained constant for a predetermined duration of a few seconds. This allows any air remaining in the top of the mold at the end of filling to be completely evacuated and assures precise and clean closure, with no overflow.

To this end, the needle 40 of the valve is held immobile in its slightly open position defining the end of filling flowrate. The opening section is then constant.

The end of filling flowrate Df is very much lower than the nominal flowrate Dn. To prevent turbulence or trapping of air, it is preferable for the end of filling flowrate Df to be below 20 g/min. In practice, the end of filling flowrate Df can be from 3 to 8 g/min. In the FIG. 7 example, it is 3 g/min.

The low flowrate end of filling phase is preferably longer than the main flowrate reduction phase C1 defined hereinafter. In practice, its duration is advantageously from 2 to 8 seconds. In the FIG. 7 example, the phase C22 has a duration of 5 s.

Phase C23: Final Flowrate Reduction

Finally, filling is stopped by complete closure of the valve, to change from the end of filling flowrate Df to the zero flowrate. This is the second or final flowrate reduction. The shoulder 43 on the needle 40 is pushed back by the rod of the actuator to the fully closed position, abutting against the change of section 34.

The closure of the valve marks the end of the filling sequence.

Polymerization is initialized after filling. To be more precise, thanks to the invention, it is advantageously possible to initialize polymerization immediately after filling, i.e. in practice within less than five seconds, which is to the benefit of productivity, and since the material to be molded remains homogeneous during filling, the optical lenses obtained are advantageously free of optical defects likely to lead to their rejection, which is to the benefit of the overall cost.

Figure 8:
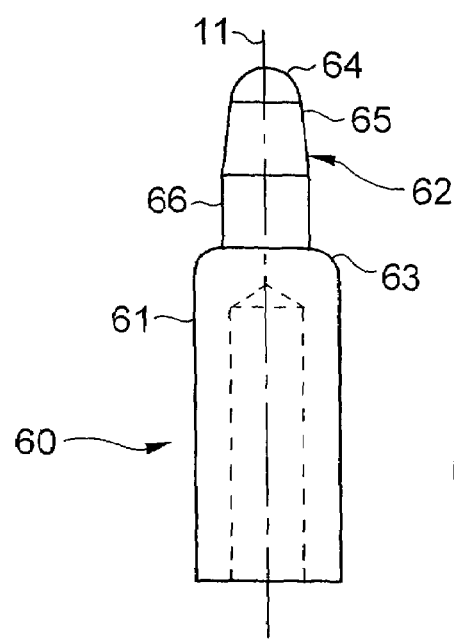
FIG. 8 is a profile view of one embodiment of the needle of the valve, shown in isolation.

FIG. 8 shows in more detail an embodiment of this type. This figure shows in isolation a needle 60 adapted to be integrated into a valve that is otherwise similar to the valve 18 previously described with reference to FIGS. 2 to 5, for example with a valve body 25 having the same axis 11. The needle 60, which is centered on the axis 11, has, in a similar way to the needle 40 from FIGS. 2 to 5, an elongate cylindrical base 61, a tip 62 and a toric shoulder 63 between the base 61 and the tip 62. The base 61 and the shoulder 63 are identical to the base 41 and the shoulder 43, respectively, of the needle 40. As well as a spherical end 64, the tip 62 has two portions, namely a conical portion 65, whose smallest diameter merges continuously with the spherical end 64, and a cylindrical portion 66 adjacent the shoulder 63 and merging continuously with the largest diameter of the conical section 65.

This type of needle with several portions is typically intended to be used in conjunction with a speed control actuator and is mounted in a valve that is otherwise similar to the valve 18 from FIGS. 2 to 5.

When the actuator is of the speed control type, it controls the speed of linear displacement of the rod 51 and the needle 40 along the axis 11 accurately with the aid of an associated conventional control unit (not shown). It is typically a hydraulic or pneumatic actuator such as the SMC® CDQ2B25-10D actuator from SMC.

Control of the speed of the needle controls simple and fixed filling sequences, with constant opening and closing phases from one filling cycle to another, fixed by the hardware. Clearly, in this case, only the speed (and not the position) of the needle being controlled, and to use a mechanical analogy, the tip 62 of the needle 60 acts in the manner of a "hydraulic cam" to execute opening and closing phases that result from the shape of its profile.

In this regard, the shape of the tip of the needle shown in FIG. 8 is not limiting on the invention; other tip shapes could be used, of course (for example with a plurality of conical sections with different slopes, or a second order continuously curved profile), generating a flowrate variation function different from that shown in FIG. 9 and described below.

It would also be possible to adjust the speed of displacement of the needle at will, in particular by providing different speeds during opening and closing.

In service, the needle is moved in translation along the axis 11 by the actuator, at a constant speed or at least at a particular speed, so that its tip moves into the constriction 33, progressively engaging therewith or disengaging therefrom. Because of the nonuniform character of the section of the tip along the axis 11 (because of the "hydraulic cam" function), this displacement of the tip causes a variation in the flow section and therefore in the flowrate corresponding to the profile of the tip.

Figure 9:
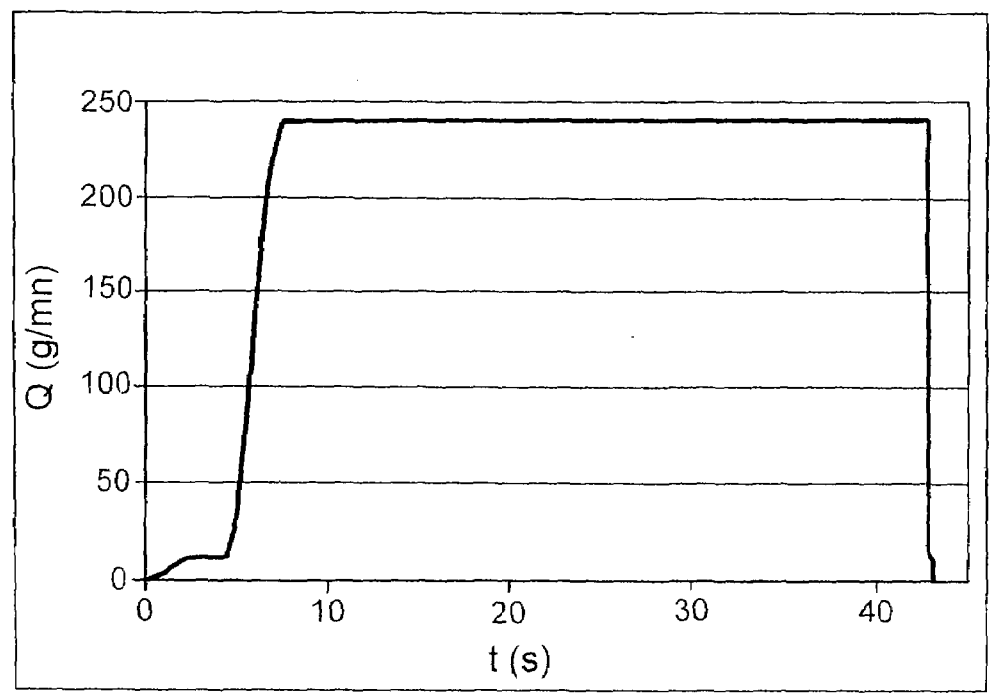
FIG. 9 is a graph representing a second example of a mold filling sequence executed by means of a valve equipped with the FIG. 8 needle.

In the example shown, the three portions of the needle generate a filling sequence like that represented in FIG. 9. In this example, this means filling the molding cavity from the bottom or from the top with a view to molding a semi-finished lens, which is necessarily thicker than a finished lens. This sequence, obtained with a supply pressure of 0.3 bar and a material having a viscosity of 200 cps, comprises three main steps, namely a rise in flowrate step A', a full flowrate filling step B' and a flowrate reduction step C'. The rise in flowrate step A' and the flowrate reduction step C' are each divided into two phases, whereas the full flowrate filling step is monotonous, as explained in more detail hereinafter.

Step A': Rise in Flowrate

The filling sequence begins with opening of the valve to generate a rise in flowrate. The needle 60 is drawn by the actuator from its initial closure position in which the shoulder 63 bears against the change of section 34 of the first branch of the flow passage 30 toward its open position, at a constant speed of 1.25 mm/s. Because of the shape of the tip of the needle, which defines its "hydraulic cam" function, opening is divided into three phases, namely a first rise in flowrate phase A1', a low flowrate start of filling phase A2' and a second rise in flowrate phase A3'.

Phase A1': First Rise in Flowrate

The first phase is the first rise in flowrate phase (A1', FIG. 9) during which the flowrate increases from its initial zero value to a relatively low predetermined value called the start of filling flowrate Dd'. Filling begins as soon as the needle leaves its closure position. The needle 60, pulled by the actuator, moves progressively away from its initial closure position to form an opening of increasing section between its shoulder 63 and the cutaway 34 of the first branch of the flow passage 30. This results in an increase in the flowrate, as is clear from FIG. 9.

In the example shown in FIG. 9, the flowrate Dd' is 10 g/min and the first rise in flowrate phase has a duration of 2.5 s. The flowrate curve is virtually linear during this phase. Other rise in flowrate curve shapes could be used for this phase, in particular with second order flowrate continuity with respect to time at the start and end of the phase. It suffices for this to adjust the shape of the tip 42 of the needle in the vicinity of the shoulder 63, for example by forming another conical portion.

Phase A2': Low Flowrate Start of Filling Phase

When the open section between the shoulder 63 and the change of section 34 reaches that between the cylindrical portion 66 of the tip 62 of the needle 60 and the constriction 33, the flowrate reaches a plateau and ceases to rise. This is the low flowrate start of filling phase (A2', FIG. 9). The active open section (i.e. that imposing the flowrate) is then stable and defined exclusively by the cylindrical portion 66 of the tip 62 of the needle 60 in co-operation with the constriction 33. In the FIG. 9 example, the flowrate is then 10 g/min. In this example, the duration of this phase, which is naturally linked to the length of the portion 66 and to the speed of displacement of the needle 60, is 2.5 s.

Phase A3': Second Rise in Flowrate

When the demarcation portion between the cylindrical portion 66 and the conical portion 65 of the tip 62 reaches the threshold of the constriction 33, the rise in flowrate phase (M', FIG. 9) begins. During this phase, the needle 60 continues to be drawn by the actuator, at the same speed, until it reaches its maximum open position, at which the flowrate reaches its nominal value Dn'. Throughout this second phase, the open section varies in accordance with a law defined by the conical portion 65 of the tip 62 of the needle 60 in co-operation with the constriction 33.

The fact that the flowrate curve during this phase is virtually linear results from the conical shape of the tip of the needle. The duration and the rate of the rise in flowrate of this phase are linked to the length and to the angle at the apex of the conical tip 42 and to the speed of displacement of the needle 40. Of course, other needle tip shapes could be adopted to obtain a different rise in flowrate curve, in particular one with a curved profile portion.

In the FIG. 9 example, the nominal flowrate Dn' is 240 g/min. The duration of this second rise in flowrate phase is 3 s.

Step B': Full Flowrate Filling

The movement of the needle is halted against a stop when it reaches the maximum open position in which the end 64 of its tip is at the threshold of the constriction 33. The flowrate is then at a maximum and corresponds to the nominal flowrate Dn' previously cited. The full flowrate filling phase (B', FIG. 9) then begins. The needle 60 is held immobile in its maximum open position. The open section is then virtually defined only by the constriction 33. In the FIG. 9 example, the flowrate is then 240 g/min. The duration of this phase, linked to the time for which the needle 60 is stationary, is 3.5 s in this example.

Step C': Reduction of Flowrate

At the end of filling, the molding cavity being full, the valve must be closed to cut off the flow of material. The needle 60 is pushed by the actuator from its fully open position toward its closed position, at a constant speed of 20 mm/s, which is significantly higher than the speed of the needle during the rise in flowrate step A'. The closing of the valve, like its opening (although much faster, and therefore less clearly perceptible), divides into three phases, namely a first flowrate reduction phase, a low flowrate end of filling phase, and a second flowrate reduction phase.

These three phases are analogous to their counterparts in step C of the first embodiment previously described with reference to FIG. 7. However, they result here from the division into portions of the tip 62 of the needle, which executes its "hydraulic cam" function in the direction opposite to, and symmetrical to, that of the rise in flowrate phase A'.

The three phases of the flowrate reduction step C' are not described in detail in that, in this example, the speed of closure of the needle during this step is too high for the phases to be perceptible. In practice, the step C can even be considered to be virtually monolithic with a very fast and virtually linear reduction in flowrate.

The invention claimed is:

1. A needle valve for filling a mold with an organic material in the liquid state, said valve including:
   a body (25) in which is formed a flow passage (30) for the material to be molded having an inlet opening (31), an outlet opening (32) and, between said two openings, a constriction (33) bounded on its upstream side by a change of section (34) forming a seat, and
   a needle (40) mounted in the body (25) so that it is mobile between a fully open position and a closure position closing the flow passage (30) with, between these two extreme positions, a range of intermediate positions of variable opening, said needle having a closure shoulder (43) adapted to bear in the closure position against the seat formed by the change of section (34) in the flow passage (30) in the body (25), so as to shut off the flow passage (30) and, projecting from said closure shoulder, an opening adjustment tip (42) that has a nonuniform section and is engaged in the constriction (33) to define a certain flow section therewith in each intermediate position of the needle (40),
   said opening adjustment tip (42) being distinct from said closure shoulder (43) and said closure shoulder (43) being shaped so as to contact said seat and close said valve about a quasilinear circular contact.

2. A valve according to claim 1, wherein the closure shoulder (43) of the needle (40) is rounded.

3. A valve according to claim 1, in which the change of section (34) of the flow passage (30) is conical.

4. A valve according to claim 3, wherein the conical change of section (34) has an angle at the apex from 30 to 60°.

5. A valve according to claim 1, wherein the tip (40) has a rounded free end (46).

6. A valve according to claim 5, wherein the free end (46) of the tip is spherical.

7. A valve according to claim 1, wherein, in the maximum open position, the free end (46) of the tip (42) is at least partially engaged in the constriction (33) of the flow passage (30).

8. A valve according to claim 1, wherein the tip (40) has at least one conical portion.

9. A valve according to claim 8, wherein the tip has a plurality of portions of different shape with no first order discontinuity between the portions.

10. A valve according to claim 9, wherein the tip has at least one cylindrical portion in addition to its conical portion.

11. A valve according to claim 1, in which at least the portion of the external surface of the needle (40) that is caused to be immersed in the flow passage (30) consists of PTFE.

12. A valve according to claim 1, wherein the inside surface of the flow passage (30) of the body (25) consists of PTFE.

13. A valve according to claim 1, wherein the needle (40) has an axis (11) of rotational symmetry and is mounted in the body (25) to slide along its axis, which coincides with the axis of the constriction (33) in the flow passage (30) of the body (25).

14. A valve according to claim 1, wherein an ethylene-propylene-diene elastomer O-ring seal (44) is mounted between the body (25) and the needle (40).

15. A valve according to claim 1, wherein the constriction (33) in the flow passage (30) is extended with a constant shape and size of section as far as the outlet orifice (32).

16. A valve according to claim 1, wherein the flow passage (30) is L-shaped, with a first branch centered on the flow axis (11) and whose free end constitutes the outlet opening (32) and a second branch centered on an axis (35) perpendicular to the flow axis (11).

17. A valve according to claim 16, wherein the first branch of the passage (30) is staggered, with a large base (36) and, at the end, the constriction (33) followed by the outlet opening (32), the base (36) and the constriction (33) being cylindrical and the change of section (34) merging with the constriction (33) and the base (36) via rounded connecting areas.

18. A method of molding an organic material optical component in an appropriate molding cavity (6), the method including a sequence of filling the molding cavity with the organic material in the liquid state and a step of hardening the material in said molding cavity, which method is characterized in that the molding cavity (6) filling sequence is effected by means of a valve (15) according to claim 1.

19. A method according to claim 18 wherein the position of the needle (40) is controlled.

20. The method according to claim 18 wherein the speed of the needle (60) is controlled.

21. A method according to claim 18 wherein the needle is operated at different speeds during opening and during closing.

22. A method according to claim 18 wherein the needle is moved during closing at a speed higher than that at which it is moved during opening.

23. A method according to claim 18, wherein the filling sequence includes the following steps:

rise in flowrate (A) from a zero flowrate to a nominal flowrate (Dn) greater than 40 g/min., full flowrate filling (B), with the nominal flowrate (Dn) maintained, and flowrate reduction (C) from the nominal flowrate (Dn) to the zero flowrate, which method is characterized in that the rise in flowrate step (A) is divided into at least two phases:

a low flowrate start of filling phase (A1), which continues until the mold is filled with the material to a height of at least 2 mm at the deepest point of the mold, the flowrate increasing during this phase to a maximum start of filling flowrate (Dd) less than 20 g/min, and then a main rise in flowrate phase (A2) to increase from the start of filling flowrate (Dd) to the nominal flowrate (Dn).

24. A method according to claim 18, wherein the material is introduced into the molding cavity (6) via an orifice (9) in the lower portion of said cavity.

25. A method according to claim 18, wherein polymerization of the material is initiated immediately after complete filling of the molding cavity.

* * * * *